S. G. CONKLING.
SHOCK ABSORBER.
APPLICATION FILED AUG. 21, 1917.

1,305,065.

Patented May 27, 1919.

INVENTOR
S. G. Conkling
BY
ATTORNEY

UNITED STATES PATENT OFFICE.

SAMUEL GOFF CONKLING, OF BROOKLYN, NEW YORK.

SHOCK-ABSORBER.

1,305,065.   Specification of Letters Patent.   Patented May 27, 1919.

Application filed August 21, 1917. Serial No. 187,356.

*To all whom it may concern:*

Be it known that I, SAMUEL GOFF CONKLING, a citizen of the United States, and resident of the borough of Brooklyn, county of Kings, city and State of New York, have invented certain new and useful Improvements in Shock-Absorbers, of which the following is a specification.

The device shown in this application is designed as an improvement upon the shock absorber for which I made application for Letters Patent of the United States, November 8, 1916, under Serial No. 130,113, and which application has been officially allowed.

In this present application I show the development of a means for obtaining a more rapid balance of certain of the parts, an improvement which allows me to use my device upon vehicles of light weight, and which are adapted to travel at a high velocity.

I will describe in this application the principle of the shock absorber, taking care, however, to emphasize the improvements to be found herein.

The following is what I consider a good means of carrying out this invention and the accompanying drawings should be referred to for a complete understanding of the specification which follows.

In the drawings:—

Similar reference numerals indicate like parts in all of the figures where they appear.

My shock absorber consists of two cylindrical members. A larger cylindrical member indicated at 1, and a smaller cylindrical member 2, arranged in the larger member and adapted to operate therein to any extent that may be required.

Figure 1:
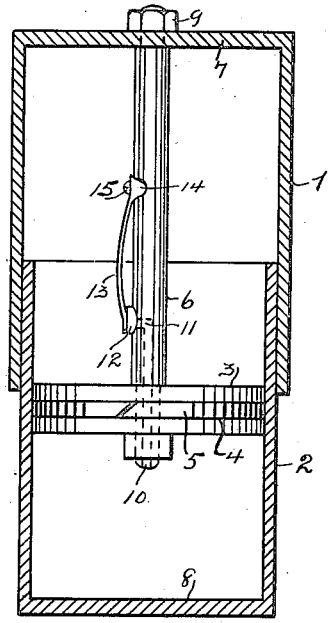
Figure 1 is a sectional view, partly in elevation, showing a certain valve arrangement.

Within the smaller cylinder 2 I arrange a piston and in Fig. 1 I show a piston disk 3 of metal or other rigid material, and having a groove 4 in which I arrange a compressible piston ring 5.

The interior of the cylinder 2 is smooth, and the piston operates therein with the same close fit to be found in ordinary engine or pump pistons.

The piston is secured upon a piston rod 6, which is in turn secured in the end plate 7 of the member 1.

I desire to call attention to the fact that the outer end of the cylinder 1 is entirely closed by a plate 7. The outer end of the cylinder 2 is entirely closed by a plate 8, and as these cylinders operate one within the other I provide a close fit between the walls of the piston members 1 and 2.

By the construction just described it will be noted that when assembled the cylinders provide a closed chamber in which the piston operates, and that it is not possible for air to enter or emerge from the cylindrical casings.

The rod 6 is stationary in the end portion 7, of the cylinder 1, and may be secured therein by means of a nut 9. The relative position of the cylindrical member 1, and the piston is a fixed position or relation, and the relative movement of the cylindrical member 1 will be accompanied by a relative movement of the piston.

In the piston rod 6 I produce a centrally disposed passage 10 extending at each side of the piston. The lower end of the passage 10 is open. At the upper end I provide a right angle branch passage 11 extending through the outer wall of the rod 6, and this passage is closed by a valve disk 12 retained in position by the spring 13, and I provide ears 14 upon the spring, and screw 15 for retaining the spring 13 and valve disk 12 in operable position.

Figure 4:
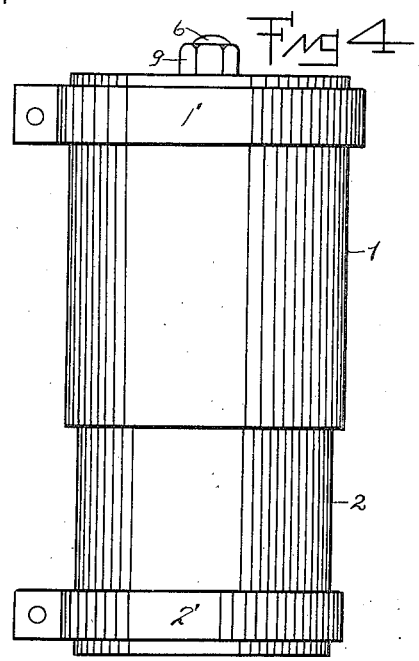
Fig. 4 is an elevation of a complete device ready for operation.

In Fig. 4 it will be noted that I provide suitable clamps such as those shown at 1' and 2' for securing my device in operable position, and it will be understood that the shape and location of these clamps may be varied at will.

In operation my shock absorber is secured in position preferably between the oppositely bowed portions of a vehicle spring, and at the point where the parts of the spring are farthest away from each other.

The relation of the parts of my device when secured in position, and when there is no load in the vehicle will preferably be about as shown in the figures.

When the vehicle is in motion the relative vibration of the body and running gear will cause the cylindrical members 1 and 2 to undergo a relative movement one within the other, and this will also cause the piston to be moved inward in the cylindrical member 2.

The movement of the piston will compress air between the piston and the end member 8, and when the vehicle is moving over a smooth road the continual compression of the air in this confined space will absorb much of the vibration caused by the movement of the vehicle.

Should the wheels of the vehicle meet an obstacle or rut in the road the shock of impact will be so suddenly transmitted to my device that an abnormal compression will result. This compression will lift the valve 12 from its seat against the pressure of the spring 13, and will allow air to escape through the passage 10 and 11.

The spring 13 is a weak spring, and retains the valve 12 in light engagement with the port or passage 11. The withdrawal of the piston by the return of the body and running gear to normal positions will cause sufficient air to be redrawn either through the valve or past the piston to assure a proper volume of air for subsequent operations.

Figure 2:
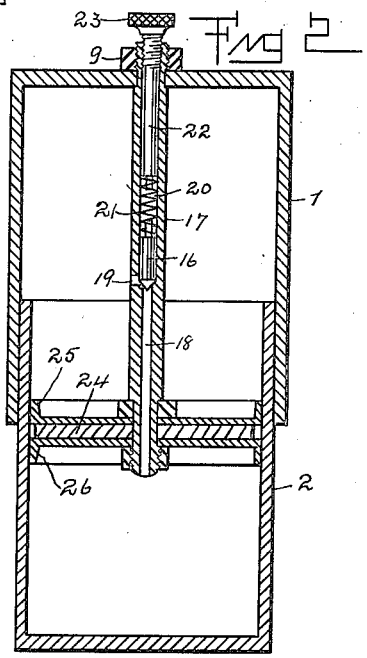
Fig. 2 is a central, sectional view of a device having an adjustable valve.

In Fig. 2 I show a valve of somewhat different construction but of the same practical operation. This valve consists of a valve member 16 arranged in the piston rod 17. In the rod 17 a small passage 18 having an angularly disposed port or outlet 19 is in line and connects with a larger passage or perforation 20. The valve member 16 is provided with a tapered end which seats in the end of the passage 18, and a light spring 21 retains the valve in position. I have found that under some conditions it is desirable to adjust the pressure of the valve 16 upon its seat, and to accomplish this I have provided a plug 22, screw threaded into the upper end of the piston rod and operable by means of a thumb nut 23. The rod 22 screwed inward compresses the spring 21 upon the valve member 16.

In the construction shown in Fig. 2 I provide a piston having a disk 24 and a plurality of cup washers 25 and 26. The operation of the device shown in Fig. 2 is similar to that of the device shown in Fig. 1 and described.

Figure 3:
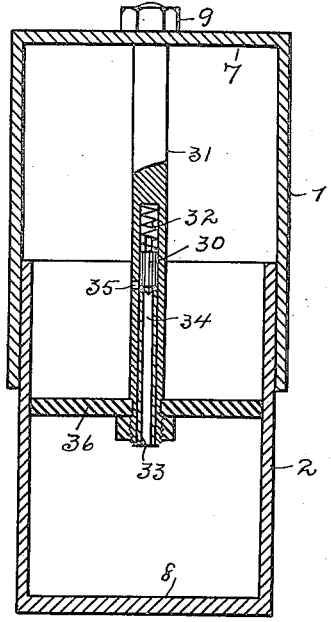
Fig. 3 is a view in section and partial elevation of a device having a modified form of valve.

In Fig. 3 the valve member 30 is introduced through the perforation in the piston rod 31, from the lower end upward, and before the introduction of the valve member I place a spring 32 in the perforation.

A tube 33 forced into the perforation in the piston rod 31 provides a seat for the valve member 30, and a means for retaining the valve member in position. This tube 33 has a passage 34 connecting with a port or angularly disposed passage 35.

In the construction shown in Fig. 3 a simple piston 36 is employed. The general arrangement and operation of the parts of this device and of the device shown in Fig. 2 is similar to that of the device shown in Fig. 1 and previously described.

From the constructions shown it will be observed that changes may be made in the arrangement and location of the valve, in the construction of the piston rod, and the piston, and I desire it understood that other modifications may be made within the scope of the appended claims without departing from the principle or sacrificing the advantages of this invention.

Having carefully and fully described my invention what I claim and desire to secure by Letters Patent is:—

1. A shock absorber comprising a pair of cylinders, one operable within the other, the inner ends of both said cylinders being open, and the outer end of both said cylinders being completely closed against the ingress or egress of air, a piston arranged between said cylinders and operable in one said cylinder, an air passage through said piston, and means for controlling said air passage.

2. A shock absorber comprising a pair of cylinders one operable within the other, a piston operable in one said cylinder, and operating with the second said cylinder, a piston rod for connecting said piston to said second cylinder, said piston rod having a passage therein, and a port connecting with said passage, and a spring operated valve adjustable from the exterior of said second cylinder and adapted for controlling said passage as herein specified.

Signed at New York city, county and State of New York, this 8th day of Aug., 1917.

SAMUEL GOFF CONKLING.

Witnesses:
G. E. S. MARR,
ARTHUR PHELPS MARR.